US007536570B2

(12) United States Patent
Leung et al.

(10) Patent No.: US 7,536,570 B2
(45) Date of Patent: May 19, 2009

(54) MICROCONTROLLER UNIT (MCU) WITH SUSPEND MODE

(75) Inventors: Kafai Leung, Austin, TX (US); Yonghong Tao, Singapore (SG)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 11/694,619

(22) Filed: Mar. 30, 2007

(65) Prior Publication Data
US 2008/0080648 A1  Apr. 3, 2008

(30) Foreign Application Priority Data
Oct. 2, 2006  (WO) ............... PCT/US2006/038301

(51) Int. Cl.
*G06F 1/00* (2006.01)
*G06F 1/04* (2006.01)
*G06F 1/12* (2006.01)

(52) U.S. Cl. ................ 713/300; 713/323; 713/500; 713/501; 713/600

(58) Field of Classification Search .......... 713/500, 713/300, 323, 501, 600
See application file for complete search history.

(56) References Cited

U.S. PATENT DOCUMENTS

| | | | | |
|---|---|---|---|---|
| 6,138,205 | A * | 10/2000 | Kawaguchi | ............... 711/104 |
| 6,219,300 | B1 * | 4/2001 | Tamaki | ................. 711/167 |
| 6,567,921 | B1 | 5/2003 | Guziak | |
| 6,687,843 | B2 * | 2/2004 | Kwak | ................. 713/500 |
| 6,892,315 | B1 | 5/2005 | Williams | |
| 7,057,967 | B2 * | 6/2006 | Johnson et al. | ............. 365/201 |
| 7,155,621 | B2 * | 12/2006 | Dai | ........................ 713/322 |
| 7,194,644 | B2 * | 3/2007 | Durand et al. | ............. 713/320 |
| 7,293,190 | B2 * | 11/2007 | Vogelsang | ................. 713/600 |
| 2001/0029589 | A1 * | 10/2001 | Takai | ........................ 713/400 |
| 2008/0074205 | A1 * | 3/2008 | Chen et al. | .................... 331/74 |

FOREIGN PATENT DOCUMENTS

| | | |
|---|---|---|
| EP | 0805386 A1 | 11/1997 |
| WO | 2006004973 A2 | 12/2006 |

OTHER PUBLICATIONS

International Search Report for Application No. 200608371-1, Austrian Patent Office, Search completed on: Nov. 26, 2007.

* cited by examiner

*Primary Examiner*—Thomas Lee
*Assistant Examiner*—Michael J Brown
(74) *Attorney, Agent, or Firm*—Howison & Arnott, L.L.P.

(57) ABSTRACT

A microcontroller unit having a suspend mode of operation includes a processing circuit for receiving digital information and processing said received digital information. Timing circuitry generates timing signals to the processing circuit responsive to signals received from a clock circuit which generates both an internal clock signal and an external clock signal. Circuitry for controlling the selective application of a synchronized enable signal and the external clock signal to the timing circuitry. The circuitry applies the internal clock signal to the timing circuitry in at least an active mode of operation of the microcontroller unit responsive to at least one first control signal and applies the external clock signal to the timing circuitry in at least a suspend mode of operation of the microcontroller unit responsive to at least one suspend control signal.

20 Claims, 5 Drawing Sheets

MICROCONTROLLER UNIT (MCU) WITH SUSPEND MODE

CROSS-REFERENCE TO RELATED APPLICATION

This application claims priority to Patent Cooperation Treaty Application No. PCT/us2006/038301, entitled MICROCONTROLLER UNIT (MCU) WITH SUSPEND MODE, filed Oct. 2, 2006, the specification of which is incorporated herein by reference.

TECHNICAL FIELD OF THE INVENTION

The present invention relates to suspend mode operations of microcontroller units, and more particularly, to a microcontroller unit having a suspend mode that operates off of an external clock signal.

BACKGROUND OF THE INVENTION

The requirement for data collection usually involves the operation of receiving analog data, converting that analog data to a digital format, and then processing the data in the digital format for conversion thereof or storage thereof. A class of devices has been developed for such applications that utilize mixed-signal technology to provide a "system-on-a-chip" (SOC) solution. These SOCs, sometimes referred to as microcontroller units (MCUs), are comprised of a digital section and may include an analog section. The analog section typically includes an analog-to-digital converter that may have the input thereof multiplexed such that it can sample analog values from a plurality of different sources, such as various sensors or transducers.

These MCUs are designed to operate on very low power, such that they can be disposed in remote areas and then run off of battery power for long durations of time. Since sampling of data is a rather intermittent operation, it is advantageous for these devices to have the ability to enter into a low power operating mode. An 80 kHz low frequency oscillator is provided on-chip for low power operation. The power budget for these types of MCU chips is divided among a number of functional elements. On the digital side, the processor has a large number of gates and typically requires a relatively high frequency of operation to provide adequate capabilities, on the order of 25 MHz. There also a plurality of timers, Input/Output (I/O) devices, etc., but the largest portion of the power budget is the processor. The clock circuitry can also take up a fair portion of the power budget, even when not driving the processor, but the primary portion of the power budget due to the power requirement of the digital processing and the clock speed thereof.

These MCUs have clock speeds ranging from 25 MHz to 100 MHz. Even if the processor is not processing information, the clock is still clocking the chip at a relatively high frequency and, as long as gates are being driven to different states, power will be dissipated. Therefore, most of these MCU devices have a low power operating mode which allows the processor or a digital portion thereof to be placed into a very "deep sleep" mode by halting the processing operation or just allow a lower power mode. In the lower power mode, it is sometimes necessary to lower the clock speed down to a low clock operating speed of, for example, 32 kHz. This can allow the processor to continue operating, but at a much lower speed.

Further, another source of power draw can be the data converters, analog-to-digital converters (ADCS) and the digital-to-analog converters (DACS) which can be disposed in an analog section. Even though this portion of the chip may operate at a lower clock speed, the time to sample an input at this clock speed might not be acceptable. Therefore, the processor will typically run at the lower clock speed for background processing operations and would be raised to the higher clock speed when doing a sampling operation. Multiple components or functional blocks associated with the MCU could be turned off, depending upon the power management philosophy upon which the part is based. However, the lowest power operation is to place the digital portion in a deep sleep mode wherein the processing operation is substantially terminated, with the configuration information for the "current state" of the processor maintained. An external monitoring circuit will monitor some conditions such as an interrupt generated by another block, an external event, etc., and will then wake up the part and initiate processing at the last current state.

In some applications, a real time clock function is required. This is easily facilitated in the MCU running at the high speed, since there are typically provided timers and the such on-board that can be clocked by a high frequency clock. One type of MCU that provides for this is the family of MCU products, C8051FXXX, manufactured by Silicon Laboratories Inc. However, to provide the real time clock functionality, the count must be segmented, or perceived in some way such that it can count seconds, minutes, hours, days, etc. and stored in a register. Typically, the entire real time clock function could be carried out in the background with a low frequency clock. In some of these MCU devices, there is provided a high frequency clock for operating the processor in the default operating mode which is the high power operating mode and a low frequency clock for operating the processor in the low power mode.

A low frequency clock can be utilized to clock the timers independent of the operation of the processor and to generate interrupts. However, the functionality of the real time clock basically takes advantage of the operation of the entire digital section. As such, in very low power applications wherein it is desirable to have time-stamp information on samples that are taken, the real time clock must be run during the very low power mode. Therefore, it would be desirable to have none of the digital section operating between taking samples. Additionally, it would be beneficial if the circuit could operate in the low power applications using an external clock signal without the use of any internal clock to completely eliminate the power requirements of the internal clock circuits while being able to communicate with the MCU reliably when needed.

SUMMARY OF THE INVENTION

The present invention disclosed and claimed herein, in one aspect thereof, comprises a microcontroller unit having a suspend mode of operation. A processing circuit within the microcontroller unit receives digital information and processes the digital information. Timing circuitry generates timing signals to the processing circuit responsive to received clock signals. A clock circuit generates an internal system clock signal and an asynchronous clock signal, for providing the timing to the timing circuit. A circuit for selectively applying the internal system clock and asynchronous clock signals to the timing circuitry applies the internal system clock signal to the timing circuitry in an active mode of operation responsive to at least one first control signal. The circuitry also applies the asynchronous clock signal to the timing circuitry in at least a suspended mode of the operation of the microcontroller unit responsive to a suspend control signal.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
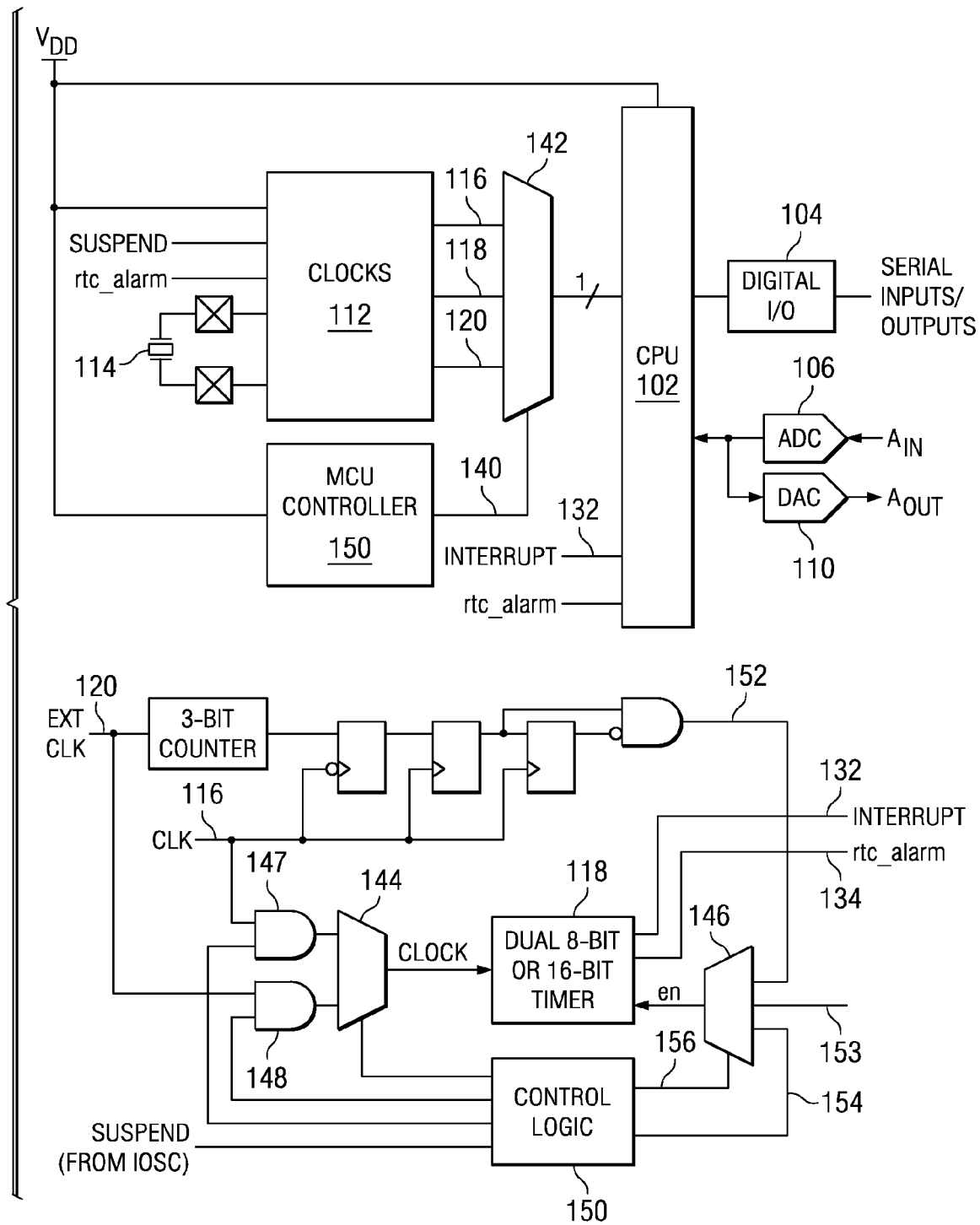
FIG. 1 illustrates an overall diagram view of an MCU that may operate in a low power mode without a real time clock.

Referring now to the drawings, wherein like reference numbers are used herein to designate like elements throughout the various views, embodiments of the present invention are illustrated and described, and other possible embodiments of the present invention are described. The figures are not necessarily drawn to scale, and in some instances the drawings have been exaggerated and/or simplified in places for illustrative purposes only. One of ordinary skill in the art will appreciate the many possible applications and variations of the present invention based on the following examples of possible embodiments of the present invention.

Referring now to FIG. 1, there is illustrated a block diagram of a processor based system that drives the mixed signal technologies that includes as a part thereof, a digital section including a central processing unit 102 and a digital I/O section 104 that is operable to interface with various serial inputs and outputs. The system also includes the analog section which provides to an analog-to-digital converter (ADC) 106 that is operable to receive one or more analog inputs and also provides a digital-to-analog converter (DAC) 110 for allowing digital information from the CPU 102 to be converted to analog output information. The operation of the CPU 102 is controlled by various clocks 112 in a primary oscillator section. These are the operational clocks that control the overall operation of the MCU. In one mode, they will be interfaced with a crystal 114 for precision operation thereof. However, the clock section 112 may provide both 25 MHz (116) and 80 kHz (108) internal clocks and external clocks 120 (asynchronous clock) for operation of the CPU 102. Switching between these clock signals may be controlled by a multiplexer 142 under the control of a MCU multiplexer switch control circuit 150 providing control signals to the multiplexer 142 over control line 140. The MCU multiplexer switch control circuit 150 provides the internal clock signal to the CPU 102 during the active mode of operation and can provide a different frequency external clock signal to the CPU 102 for low power operation.

The clocks 112 also provide clock signals to timer 118 through a multiplexer 144. The timer 118 provides timing information to the MCU 102 in both active and suspend modes of operation, and acts a general purpose timer for peripheral devices. During the suspend mode of operation, the timer 118 will operate under control of the external clocks rather than the internal clocks which will be powered down to conserve system power. During the active mode of operation, the timer 118 can operate under control of an internal clock with a synchronized enable signal 152 based on the external clock. The timer 118 can also operate under internal clock in active mode. The timer 118 contains current time and date information therein separate and independent of the operation of the digital and analog sections and the power required or provided thereto. This information can be utilized by the CPU 102. During operation, the timer 118 will update its internal time and date information. The timer 118 is operable to generate an interrupt on interrupt line 132 to the CPU 102. As will be described herein below, this interrupt facilitates waking up the CPU 102 when it is placed into idle mode. The timer 118 also generates a RTC alarm signal upon timer overflow. The RTC alarm wakes up the internal oscillator when it is placed in suspend mode. However, the CPU 102 at any time can query the timer 118 for information stored therein.

The clock circuit 112 includes an internal clock which is operable to generate a base frequency of around 25 MHz that can be multiplied or divided. The external clocks may provide external frequencies of around 32 kHz for an alternative low frequency time base for the system clock. This will allow the CPU 102 to operate at a low frequency for power conservation purposes during an active mode. The clock signals are gated to the multiplexer 144 through a gate 147 connected to the internal clock signal and a gate 148 connected to the external clock signal. The multiplexer 144 and the gates 147, 148 are under the control of the timer multiplexer controller 150. The controller 150 causes the multiplexer to switch between the clock signals depending on the mode of operation and controls the gating of signals onto the multiplexer 144 through gates 147, 148 to prevent clock glitch problems. The multiplexer 146 selects the appropriate timer enable signals according to modes of operation. Control logic 150 not only generates timer enable signal 154 based on external clock, it also generates the switch signal 156 to switch between timer enable signals based on synchronized external clock 152, enable signal based on internal clock, and enable signal based on external clock.

Figure 2:
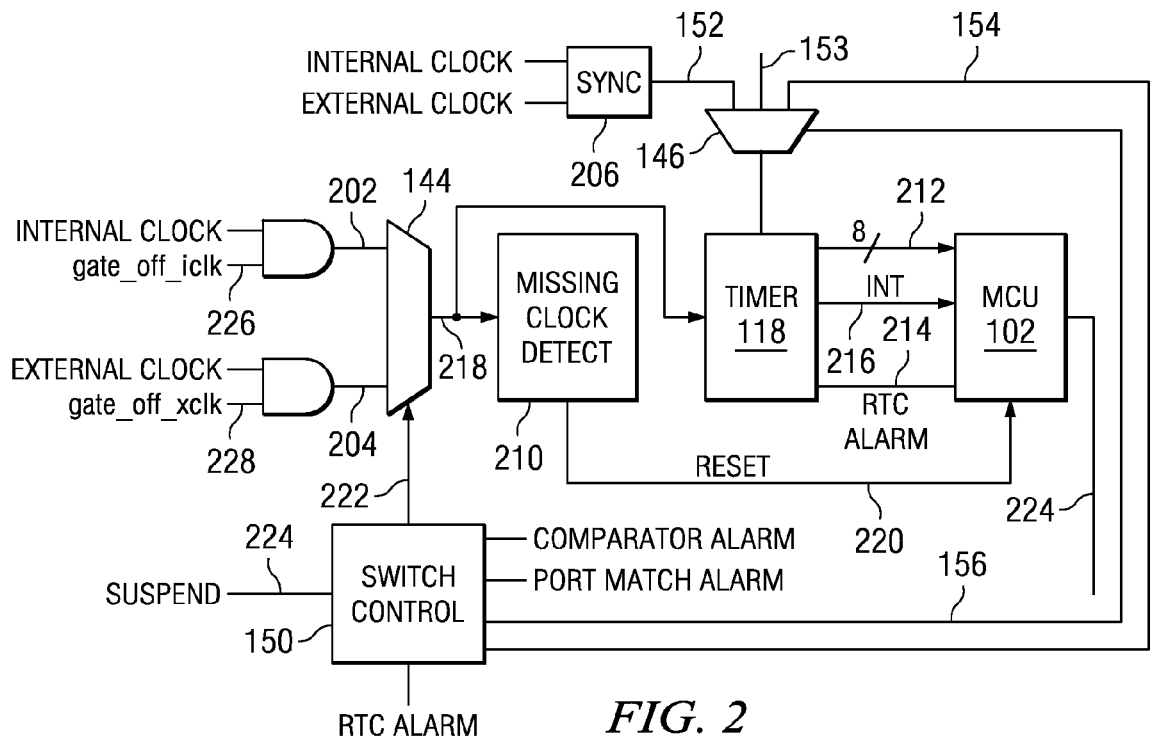
FIG. 2, more particularly illustrates the configuration of the circuitry enabling operation of an MCU in a low power mode without a real time clock.

Referring now to FIG. 2, there is provided a more detailed illustration of the manner in which internal and external clock signals from the clocks 112 may be applied to the timer 118. The internal and external clock signals are provided to the clock multiplexer 144. The internal clock is provided to the clock multiplexer 144 via input line 202. The external clock signals are provided to the clock multiplexer via line 204.

Additionally, the internal and external clock signals are provided to a synchronization circuit 206 to generate synchronization of the internal and external clock timer enable signals during switching between the clock signals.

The external oscillator signal is completely asynchronous with the internal circuits of the microcontroller unit 102 which are running on the internal oscillator during the normal mode of operation. If the timer circuit 118 uses the external clock signal as a direct clock source, the timer 118 and MCU 102 will be running asynchronously. This is not an optimal situation for the analog circuits associated with the MCU 102 due to noise management reasons. Additionally, communication between the timer 118 and other circuits would not be reliable due to possible signal glitches. All of the signals crossing clock domains have to be synchronized to avoid glitches. The chip size will increase because of the number of synchronization circuits needed as there are many signals crossing various clock domains.

However, rather than including a synchronization circuit each time a signal crosses a clock domain, the present circuit synchronizes the external clock signal with the internal clock signal using synchronization circuit 206. This synchronized external clock signal is used as a timer enable signal. When the timer 118 uses the external clock signal during active mode from the suspended mode of operation, the actual clock signal to the timer 118 is internal clock signal and works together with synchronized timer enable signal via the sync circuit 206.

There is no internal clock source during the suspend mode of operation. During the suspend mode of operation the external clock, which is asynchronous, is used directly by the timer 118. Since the MCU 102 and other peripheral components are idle during this time and not using any clock signal, there is no communication between the timer 118 and other MCU circuits. Thus, there is no crossing of signals between clock domains and there is no need for signal synchronization of the asynchronous signal.

The key to glitch free clock switching is to make sure that both the "original" clock and "new" clock signals are "off" or at zero volts before any switching takes place. With the original clock being at zero volts, the switch must happen after the falling edge of the "new" clock signal. For example, to switch from the internal clock to the external clock when entering the suspend mode of operation, glitch free operation is guaranteed by generating a signal to gate off the internal clock signal and manage the multiplexer switch signal to change states after the falling edge of the external clock. Since both of the clock sources are at zero volts at the moment of switching, the multiplexing between the signals will be glitch free. The same theory is applied to a wake up condition when the clock source switches from the external clock signal back to the internal clock signal.

The multiplexer 144 selection signals provided from the switch control 150 always synchronize to the falling edge of the "new" clock. If the trigger of the suspend mode happens right before the counter (or timer) enable edge, the counter may miss an up-count. This is due to the internal oscillator being stopped immediately upon entering the suspend mode, while the clock source multiplexer is waiting for the falling edge of the external clock. The design ensures that there is no missing count caused by any switching. A check is done after the switch to make sure that the counter did not miss counting due to clock switching.

The clock multiplexer 144 enables any of the clock signals on any of lines 202 and 204 to be applied to both the missing clock detect circuit 210 and the timer circuit 118. As described previously, the timer circuit 118 provides the timing control signals to the microcontroller unit 102 via an 8 bit bus 212. Additionally, the timer 118 can generate an RTC alarm to the MCU 102 and the internal clock source in circuit 112 via line 214 and various interrupts to the MCU via line 216.

The missing clock detect circuit 210 monitors the output line 218 of the clock multiplexer 144 to confirm that either the internal or external clock signal is being applied thereto based upon the modes of operation. If missing clock detect circuit 210 determines that no clock signal is present on output line 218 of clock multiplexer 144 a reset signal is generated to the microcontroller unit 102 on reset line 220. This enables a complete reset of the microcontroller unit 102 when lack of an applied clock signal would necessarily cause errors within the microcontroller unit 102 operation.

The switch control circuit 150 provides control signals to the clock multiplexer 144 via control line 222 to enable selection of one of the input lines 202 or 204 depending on which clock signal is to be provided at a particular time as discussed previously. The switch control circuitry 150 is responsive to input signals such as the comparator alarm, port match alarm, RTC alarm on various external inputs and the suspend signal on input line 224. During normal operation, the switch control circuit 150 selects the internal clock signal for provision to the timer 118, and thus, the clock signal on line 202 or line 204 is multiplexed onto output line 218 to the timer 118. If timer uses the internal system clock as time base during normal operation, the timer enable signal 153 generated by MCU will not require further synchronization. However, if timer uses (asynchronous) external clock as time base during that time, the timer enable signal will need to be synchronized to the internal system clock in sync circuit 206 before being used. When the suspend signal on line 224 is applied to the switch control circuit 150 and the internal clock source in 112, the internal clock source stops at zero volts and the MCU operation is completely suspended. Once the suspend mode is completely entered, the multiplexer 144 multiplexes the external clock signal after the falling edge on the external clock signal on line 204 onto output line 218 for provision to the timer 118. Switch control circuit 150 is responsible to generate the time enable signal 154 based on the external clock, along with the switch signal 156 for multiplexer 146. This enables the timer 118 to continue operating during the suspend mode without requiring the higher power requirements associated with the internal clock signal and MCU. Thus, the switch control circuit 150 enables the clock multiplexer 144 and timer enable multiplexer 146 to select between the internal and external clock, as well as, synchronous and asynchronous enable signals depending upon whether or not the MCU 102 is operating in the suspended mode or normal mode of operation. The suspended operation enables the continued operation of the timer circuit 118 using the external clock signal without incurring the additional power requirements associated with active operations.

The switch control circuitry 150 controls operation of the clock multiplexer 144 and timer enable multiplexer 146 in order to provide both clock and enable signaling of the timer 118. The switch control circuit 150 generates a control signal to toggle the mux select signal for the clock multiplexer 144 when the CPU sets the suspend bit indicating that the internal oscillator of 25 MHz will be stopped. This signal is applied to the switch control circuit via line 224. This causes the generation of control signal on line 226 by control block 150 to gate off the internal clock. Then timer 118 will switch from the internal system clock signal to the external clock signal. Additionally, a control signal 228 is generated by control block 150 to gate off the external clock before the switch control circuit 150 generates a toggle signal on line 222 to the clock multiplexer 144 when the internal oscillator is awakened by any of a number of events and the timer 118 switches from the external clock to the internal system clock. These events may include indication of a port match, a comparator zero interrupt or an RTC timer overflow condition. Upon multiplexer control signal 222 switching to the "new" clock, switch control unit 150 will release gate off signals 226 or 228 so that MCU can change between suspend mode and active mode at any moment.

Figure 3:
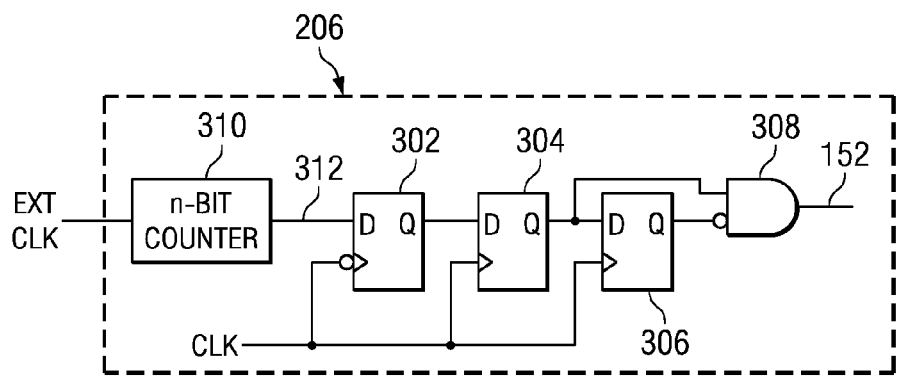
FIG. 3 illustrates the synchronization circuit for synchronizing external and internal oscillator clock signals.

Referring now to FIG. 3, there is illustrated a more detailed illustration of the sync circuit 206. Sync circuit 206 consists of an n-bit counter 310, a first flip-flop latch 302, a second flip-flop latch 304 and a third flip-flop latch. The n-bit counter is used to further reduce the timer frequency. "N" can be any value greater than or equal to 0. The asynchronous counter output 312 is applied to the D input of latch 302. The Q output of latch 302 is applied to the D input of latch 304. The Q output of latch 304 is applied to the D input of latch 306. The Q output of latch 306 is connected to the inverting input of an "and" gate 308. The non-inverting input of gate 308 is connected to the D-input of latch 306. The output of gate 308, which detects the rising edge of line 312 is connected to line 152. The high frequency internal clock signal is provided to the clock inputs of latch 302, 304 and 306. By applying the asynchronous external signal sequentially through latches 302 to 306, the D flip-flops 302, 304 and 306 provide synchronization of the timer enable signal with the internal clock signal after the external clock signal is received at the input of D flip-flop 302. This sequence of latches synchronizes the external clock signal over two clock cycles of the internal clock signal before application to line 152.

Figure 4:
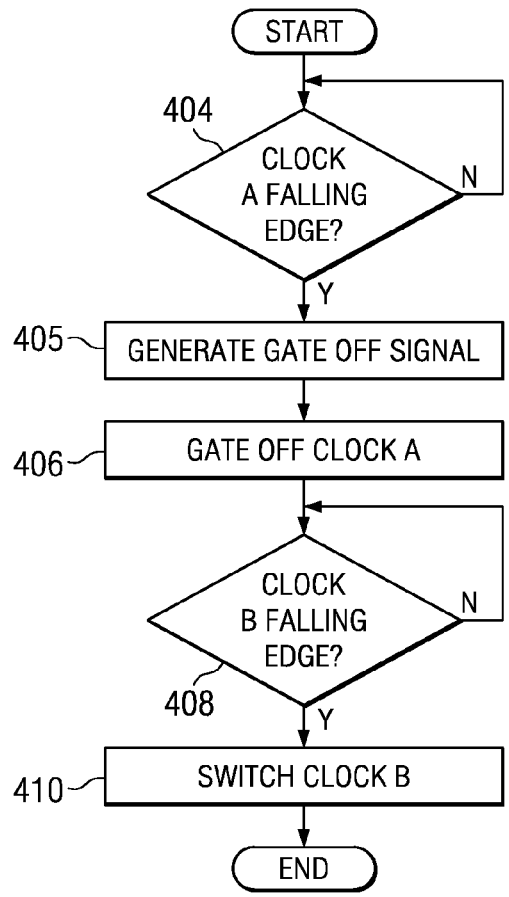
FIG. 4 illustrates the process for switching between the internal and external clock signals.

In order to provide a glitch free timer clock signal to the timer 118, the control logic of the switch control 150 provides for the switching from the system clock to the external clock or from the external clock to the system clock as illustrated in FIG. 4. For purposes of this discussion we will generally refer to clock A and clock B rather than the internal and external clocks which may be either of clock A or B. When switching from clock A to clock B, inquiry step 404 looks for a falling edge of clock A. Once the falling edge of clock A is detected, clock A is gated off from the multiplexer at step 406. It is done by a control signal generated in step 405. Next, inquiry step 408 monitors for the falling edge of clock B. Once the falling edge of clock B is detected, clock B is switched into the multiplexer circuit at step 410. This process is the same no matter which clock signals are being switched between.

Figure 5:
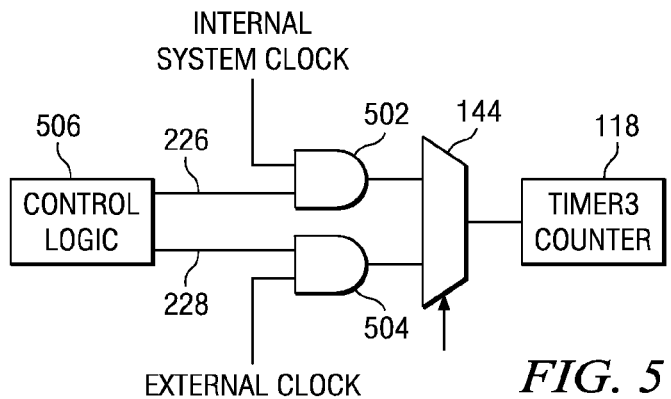
FIG. 5 illustrates the circuitry for switching between the internal and external clock signals.

The circuitry for implementing this process is more fully illustrated in FIG. 5 where there is illustrated the multiplexer 144, the internal or system clock signal is applied to an AND gate 502. The external clock signal is provided to an AND gate 504. The second inputs of AND gates 502 and 504 are connected to control logic 506 which is responsible for gating off a signal onto its respective input to multiplexer 144 in accordance with the flow chart described previously with respect to FIG. 4. Control logic 506 is part of switch control 150. Once a signal has been gated onto multiplexer 144, the signal is applied to the timer circuit 118. It is necessary to use a gated clock signal even if the internal clock signal has already been shut off by the suspend signal. This is to avoid clock glitch if a "wakeup" condition, i.e., internal clock signal will resume toggling, is asserted before clock switching is completed. When a "wakeup" condition occurred after clock switched to external clock, control logic 506 will generate signal 228 to gate off external clock to guarantee glitch free switching in accordance with the flow chart described previously with respect to FIG. 4.

Figure 6:
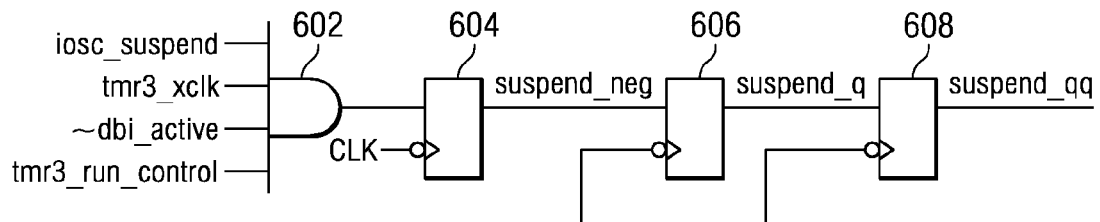
FIG. 6 illustrates the gated clock system for preventing clock glitch when switching between the external and internal clock signals.

Referring now to FIG. 6, there is illustrated the circuitry within the switch control circuit 150 for preventing clock glitch when entering suspend condition. Utilizing the circuit of FIG. 6, clock switching will only occur after "suspend_qq" is toggled to high. The circuit is to synchronize the suspend signal to the external clock. The anti-glitch circuit of the switch control circuit 150 consists of a gate 602 and three D flip-flop circuits 604, 606 and 608. The gate 602 receives a number of inputs which qualify a suspend condition of the MCU 102. All of these conditions being asserted high will cause the output of gate 601 to be asserted high. The output of gate 602 is connected to the D input of D flip-flop 604. The Q output of D flip-flop 604 line "suspend_neg" is connected to the D input of D flip-flop 606. The Q output of D flip-flop 606 line "suspend_q" is connected to the D input of the flip-flop 608. The Q output of D flip-flop 608 is connected to line "suspend_qq". The internal clock signal is connected to the clock input of D flip-flop 604. The external clock signal is connected to the clock input of D flip-flops 606 and 608. Once the suspend signal has been applied, it takes two external clock cycles to propagate the suspend signal from the system clock to the external clock. If the internal oscillator is awakened during these two external clock signals, the multiplexer will continue to select the internal clock rather than the external clock signal. However, the internal clock has already been gated off. No clock signal will pass to timer 118 until clock multiplexer 144 has been switched to the external clock. Timer value is checked to make sure that the timer did not miss counting due to clock switching.

Figure 7:
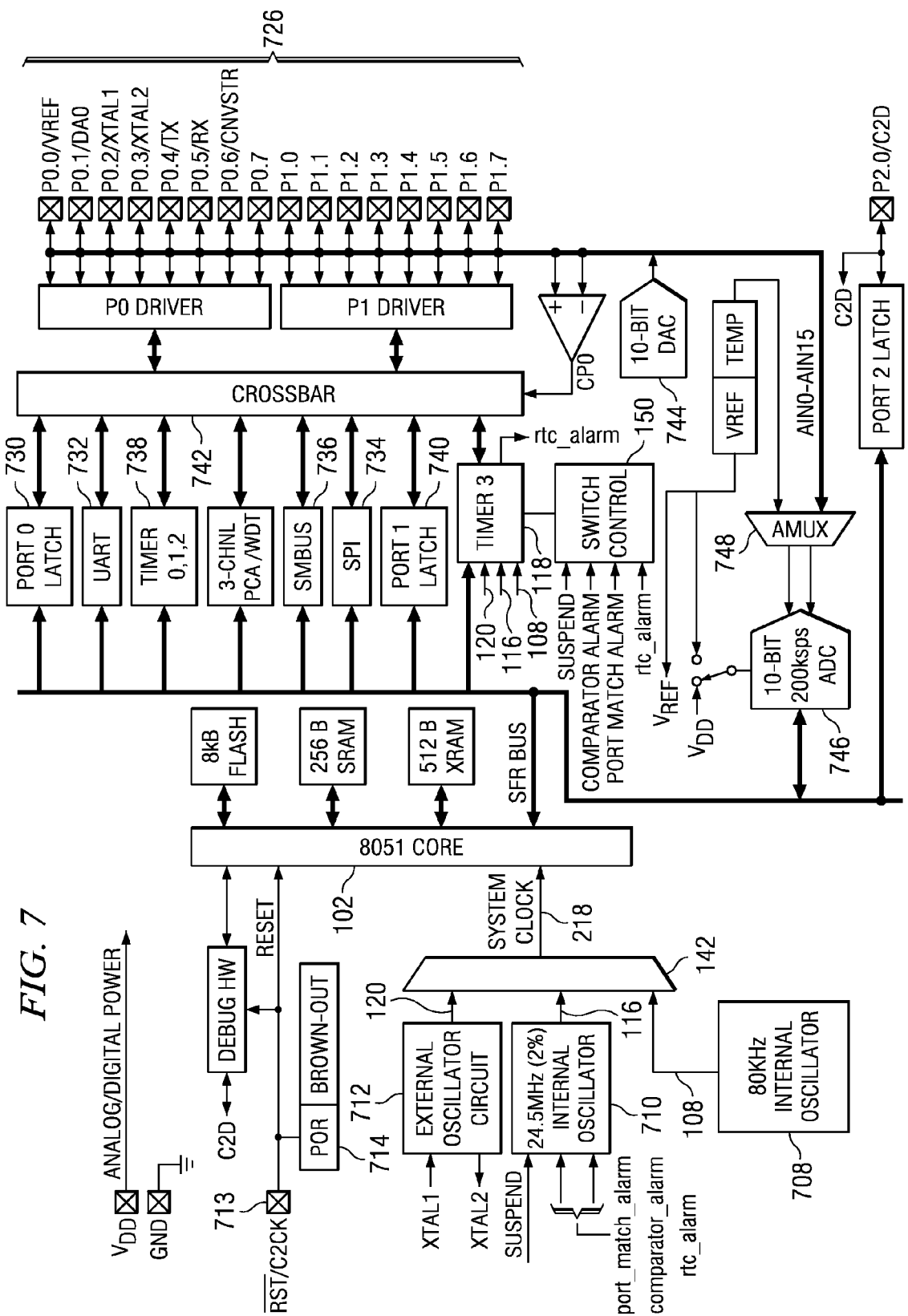
FIG. 7 illustrates an overall block diagram of the MCU chip showing the various functional blocks thereof.

Referring now to FIG. 7, there is illustrated a block diagram of the MCU. As noted herein above, the MCU is generally of the type similar to part number C8051F330/1 manufactured by Silicon Laboratories Inc. The MCU includes in the center thereof a processing core 102 which is typically comprised of a conventional microprocessor of the type "8051." The processing core 102 receives a clock signal on a line 218 from a multiplexer 142. The multiplexer 142 is operable to select among multiple clocks. There is provided an 80 kHz internal oscillator 708, a 24.5 MHz trimmable internal precision oscillator 710 or an external crystal controlled oscillator 712. The precision internal oscillator 710 is described in U.S. patent application Ser. No. 10/244,344, entitled "PRECISION OSCILLATOR FOR AN ASYNCHRONOUS TRANSMISSION SYSTEM," filed Sep. 16, 2002, which is incorporated herein by reference. The processing core 102 is also operable to receive an external reset on terminal 713 or is operable to receive the reset signal from a power-on-reset block 714, all of which provide a reset to processing core 102. The processing core 102 has associated therewith a plurality of memory resources, those being either flash memory 716, internal memory space SRAM 718 or external memory space SRAM 720. The processing core 102 interfaces with various digital circuitry through an on-board digital bus 722 which allows the processing core 102 to interface with various operating pins 726 that can interface external to the chip to receive digital values, output digital values, receive analog values or output analog values. Various digital I/O circuitry are provided, these being latch circuitry 730, serial port interface circuitry, such as a UART 732, an SPI circuit 734 or an SMBus interface circuit 736. Three timers 738 are provided in addition to another latch circuit 740. All of this circuitry 730-740 is interfaceable to the output pins 726 through a crossbar device 742, which is operable to configurably interface these devices with select ones of the outputs. The digital input/outputs can also be interfaced to a digital-to-analog converter 744 for allowing a digital output to be converted to an analog output, or to the digital output of an analog-to-digital converter 746 that receives analog input signals from an analog multiplexer 748 interfaced to a plurality of the input pins on the integrated circuit. The analog multiplexer 748 allows for multiple outputs to be sensed through the pins 726 such that the ADC can be interfaced to various sensors. Again, the MCU 102 is a conventional circuit.

Figure 8:
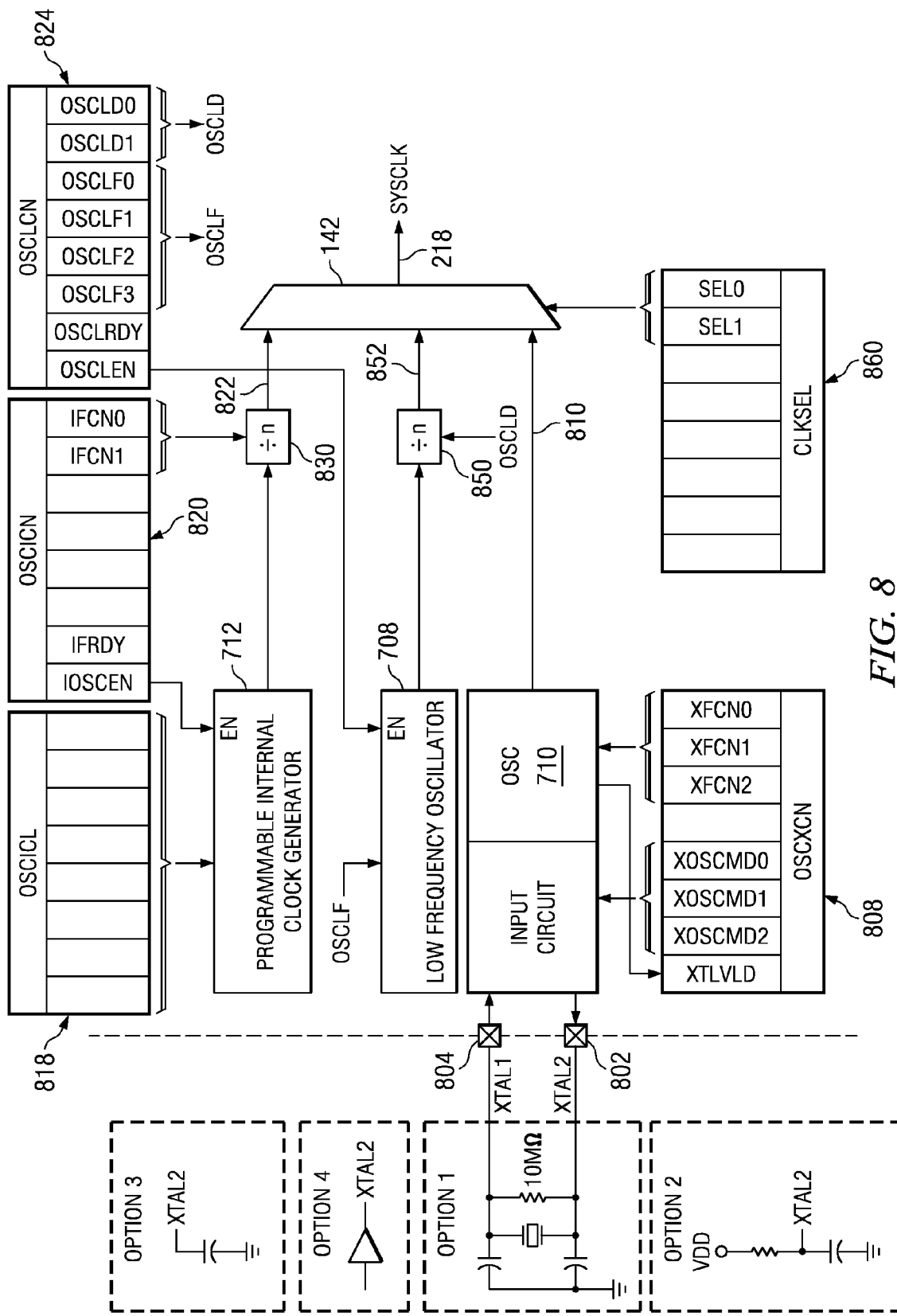
FIG. 8 illustrates a block diagram of the oscillators utilized for the processing operation of the MCU.

Referring now to FIG. 8, there is illustrated a schematic diagram of the primary oscillator section comprised of the oscillators 708, 710 and 712 and the multiplexer 142. The oscillator 710 is a crystal controlled oscillator that is interfaced through two external terminals 802 and 804 to an external crystal 806 and operates up to frequencies of 25 MHz. A register 808 is provided, labeled OSCXCN, which is operable to drive control signals for the oscillator 710 and to record output values thereof. The output of the oscillator 710 is provided on a line 810 to one input of the multiplexer 142. The programmable precision trimmable oscillator 712 is controlled by a register 818 and a register 820 to control the operation thereof, i.e., to both set the frequency thereof and to enable this oscillator. The output of the oscillator 712 is processed through a divide circuit 830, the divide ratio thereof set by bits in the register 820 to provide on an output 822 a precision high frequency clock to another input of the multiplexer 142. The 80 kHz low frequency oscillator 708 is controlled by register OSC LCN 824 to control the operation thereof, i.e., to both set the frequency thereof and to enable this oscillator. The output of the oscillator 708 is processed through a divide circuit 850, the divide ratio thereof set by bits in the register OSC LCN low frequency clock at line 852 provides another input option to multiplexer 142. The output of the multiplexer 142 is provided to the MCU 102 on the clock line 218 as a system clock signal SYSCLK. The clock select operation is facilitated with a register 860 labeled SEL, which controls the multiplexer 142.

The programmable high frequency oscillator 712 is the default clock for system operation after a system reset. The values in the register 818, labeled OSCICL, provide bits that are typically programmed at the factory, these bits stored in the flash memory. The center frequency of the high frequency clock is 24.5 MHz. The divide circuit 830 can provide a divide ratio of one, two, four or eight. The oscillator 712, in the C8051F330 device by way of example only, is a ±2 percent accuracy oscillator which has a center frequency that, although programmed at the factory, is allowed to be adjusted by changing the bits in the register 818. There are provided seven bits in the register 818 that are calibratable bits. The register 820 provides an enable bit for the oscillator 712 and a bit that determines if the oscillator 712 is running at the programmed frequency. Two bits in the register 820 are utilized to set the divide ratio of the divider 830.

It will be appreciated by those skilled in the art having the benefit of this disclosure that this invention provides a microcontroller unit with a non-RTC enabled suspend mode. A multi-function timer is included to provide timing information for peripherals during active mode. It can also be used to keep track of time during both active mode and low-power suspend mode. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A microcontroller unit (MCU) having a suspend mode of operation, comprising:
   a processing circuit for receiving digital information and processing said received digital information;
   timing circuitry for generating timing signals to the processing circuit during the suspend mode;
   a clock circuit for generating an internal system clock signal and receiving an external, asynchronous clock signal providing the timing for said timing circuit, wherein the system clock is independent of the asynchronous clock; and
   circuitry for controlling the selective application of the internal system clock signal and the asynchronous clock signal to the timing circuitry, the circuitry applying the internal system clock signal to the timing circuitry in at least an active mode of operation of the microcontroller unit responsive to at least one first control signal and applying the asynchronous clock signal to the timing circuitry in at least the suspend mode of operation of the microcontroller unit responsive to at least one suspend control signal.

2. The microcontroller unit (MCU) of claim 1, wherein the circuitry for controlling the selective application further comprises:
   a multiplexer for selectively switching between at least the internal system clock signal and the asynchronous clock signal responsive to a switching control signal; and
   a switching control circuit for controlling the multiplexer via the switching control signal to apply the internal system clock signal to the timing circuitry responsive to the at least one first control signal or to apply the asynchronous clock signal to the timing circuitry responsive to the at least one suspend control signal.

3. The microcontroller unit (MCU) of claim 2, wherein the switching control circuit further controls the timing circuitry responsive to a second switching control signal to apply a synchronized enable signal to the timing circuitry responsive to the at least one first control signal or to apply an asynchronous enable signal to the timing circuitry responsive to the at least one suspend control signal, wherein the synchronized enable signal comprises the asynchronous clock signal synchronized with the internal clock signal.

4. The microcontroller unit (MCU) of claim 2, wherein the switching control circuit further comprises an anti-glitch circuit for preventing glitches caused by a wake-up condition occurring while the multiplexer is switching from the internal clock signal to the asynchronous clock signal.

5. The microcontroller unit (MCU) of claim 4, wherein the anti-glitch circuit further comprises:
   a gate connected to receive a plurality of control signals, each of the control signals driving the output of the gate high;
   a first flip-flop circuit having an input connected to an output of the gate and having a clock input connected to the internal clock signal; and
   a second plurality of flip-flop circuits having an input connected to the output of the first flip-flop and a clock input connected to the external clock signal for delaying application of the external clock signal to the multiplexer for a plurality of clock cycles.

6. The microcontroller unit (MCU) of claim 1, further including;
   a synchronization circuit for synchronizing the asynchronous clock signal with the internal clock signal to generate the synchronized enable signal; and
   a second multiplexer for receiving the synchronized enable signal from the synchronization circuit and the asynchronous enable signal from the switching control circuit and selecting therebetween responsive to a timer enable control signal from the switching control circuit to apply the selected signal to the timing circuitry.

7. The microcontroller unit (MCU) of claim 6, wherein the synchronization circuit further comprises:

a first flip-flop circuit having the external clock signal connected to an input and the internal clock signal connected to a clock input; and
a second flip-flop circuit having a second input connected to an output of the first flip-flop circuit and the internal clock signal connected to a second clock input;
a third flip-flop circuit having a third input connected to an output of the second flip-flop circuit and the internal clock signal connected to a third clock input; and
wherein the third flip-flop circuit provides as an output thereof the asynchronous clock synchronized with the internal clock signal and being used as the synchronized enable signal.

8. The microcontroller unit (MCU) of claim 1, wherein the internal clock signal is further applied to the circuitry for controlling the selective application, the circuitry for controlling the selective application providing the internal clock signal to the timing circuitry during the active mode.

9. The microcontroller unit (MCU) of claim 1, further including a missing clock detect circuit for detecting the presence of the internal clock signal or the asynchronous clock signal and for generating a reset signal responsive to an absence of any clock signal.

10. A microcontroller unit (MCU) having a suspend mode of operation, comprising:
a processing circuit for receiving digital information and processing said received digital information;
timing circuitry for generating timing signals to the processing circuit during the suspend mode;
a clock circuit for generating an internal system clock signal and receiving an external asynchronous clock signal providing the timing for said timing circuit, wherein the system clock is independent of the asynchronous clock; and
a multiplexer for selectively switching at least the internal system clock signal and the asynchronous clock signal to the timing circuitry responsive to a switching control signal;
a second multiplexer for selectively switching at least a synchronized enable signal and an asynchronous enable signal to the timing circuitry responsive to a timer enable control signal;
a switching control circuit for controlling the multiplexer to apply the internal clock signal to the timing circuitry in at least an active mode of operation of the microcontroller unit responsive to at least one first control signal and to apply the asynchronous clock signal to the timing circuitry in at least a suspend mode of operation of the microcontroller unit responsive to at least one suspend control signal and for controlling the second multiplexer to apply the synchronized enable signal to the timing circuitry in at least the active mode of operation and to apply the asynchronous enable to the timing circuitry in at least the suspend mode of operation;
a synchronization circuit for synchronizing the asynchronous clock signal with the internal system clock signal to generate the synchronized enable signal.

11. The microcontroller unit (MCU) of claim 10, wherein the switching control circuit further comprises a suspend anti-glitch circuit for preventing glitches caused by a wake-up condition occurring while the multiplexer is switching from the internal clock signal and the asynchronous clock signal.

12. The microcontroller unit (MCU) of claim 10, wherein the suspend anti-glitch circuit further comprises:
a gate connected to receive a plurality of control signals, each of the control signals driving the output of the gate high;

a first flip-flop circuit having an input connected to an output of the gate and having a clock input connected to the internal clock signal; and
a second plurality of flip-flop circuits having an input connected to the output of the first flip-flop circuit and a clock input connected to the external clock signal for delaying application of the external clock signal to the multiplexer for a plurality of clock cycles.

13. The microcontroller unit (MCU) of claim 12, wherein the synchronization circuit further comprises:
a first flip-flop circuit having the external clock signal or a divided external clock signal connected to an input and the internal clock signal connected to a clock input; and
a second flip-flop circuit having a second input connected to an output of the first flip-flop circuit and the internal clock signal connected to a second clock input;
a third flip-flop circuit having a third input connected to an output of the second flip-flop circuit and the internal clock signal connected to a third clock input; and
wherein the third flip-flop circuit provides as an output thereof the asynchronous clock synchronized with the internal clock signal being used as the synchronized enable signal.

14. The microcontroller unit (MCU) of claim 10, further including a missing clock detect circuit for detecting the presence of the internal clock signal or the asynchronous clock signal and for generating a reset signal responsive to an absence of any clock signal.

15. A microcontroller unit (MCU) having a suspend mode of operation, comprising:
a processing circuit for receiving digital information and processing said received digital information;
timing circuitry for generating timing signals to the processing circuit during the suspend mode;
a clock circuit for generating an internal clock signal and receiving an external asynchronous clock signal providing the timing for said timing circuit, wherein the system clock is independent of the asynchronous clock;
a synchronization circuit for synchronizing the external clock signal with the internal clock signal to generate a synchronized enable signal; and
circuitry for controlling the selective application of the synchronized enable signal and an asynchronous enable signal to the timing circuitry to control the operation thereof, the circuitry applying the synchronized enable signal to the timing circuitry in at least an active mode of operation of the microcontroller unit responsive to at least one first control signal and applying the asynchronous enable signal to the timing circuitry in at least a suspend mode of operation of the microcontroller unit responsive to at least one suspend control signal.

16. The microcontroller unit (MCU) of claim 15, wherein the circuitry for controlling the selective application of the internal clock further comprises:
a multiplexer for selectively switching between at least the internal clock signal and the external clock signal responsive to a switching control signal; and
a switching control circuit for controlling the multiplexer via the switching control signal to apply either the internal clock signal to the timing circuitry responsive to the at least one first control signal or to apply the external clock signal to the timing circuitry responsive to the at least one suspend control signal.

17. The microcontroller unit (MCU) of claim 16, wherein the switching control circuit further comprises an anti-glitch circuit for preventing glitches caused by a wake-up condition occurring while the multiplexer is switching from the internal clock signal to the external clock signal.

18. The microcontroller unit (MCU) of claim 17, wherein the suspend anti-glitch circuit further comprises:
   a gate connected to receive a plurality of control signals, each of the control signals driving the output of the gate high;
   a first flip-flop circuit having an input connected to an output of the gate and having a clock input connected to the internal clock signal; and
   a second plurality of flip-flop circuits having an input connected to the output of the first flip-flop circuit and a clock input connected to the external clock signal for delaying application of the external clock signal to the multiplexer for a plurality of clock cycles.

19. The microcontroller unit (MCU) of claim 15, wherein the synchronization circuit further comprises:
   a first flip-flop circuit having the external clock signal or divided external clock signal connected to an input and the internal clock signal connected to a clock input; and
   a second flip-flop circuit having a second input connected to an output of the first flip-flop circuit and the internal clock signal connected to a second clock input;
   a third flip-flop circuit having a third input connected to an output of the second flip-flop circuit and the internal clock signal connected to a third clock input; and
   wherein the third flip-flop circuit provides as an output thereof the asynchronous clock synchronized with the internal clock signal.

20. The microcontroller unit (MCU) of claim 15, further including a missing clock detect circuit for detecting the presence of the internal clock signal or the external clock signal and for generating a reset signal responsive to an absence of both the internal clock signal and the external clock signal.

* * * * *